Aug. 29, 1967
P. BOISSIER
3,338,183
RIGID RAILWAY BOGIE
Filed Aug. 12, 1964
6 Sheets-Sheet 1
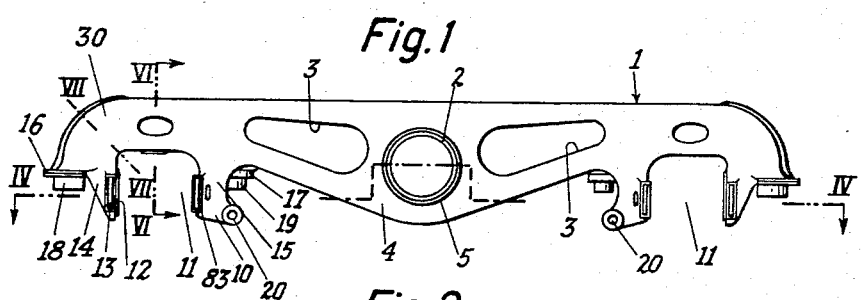
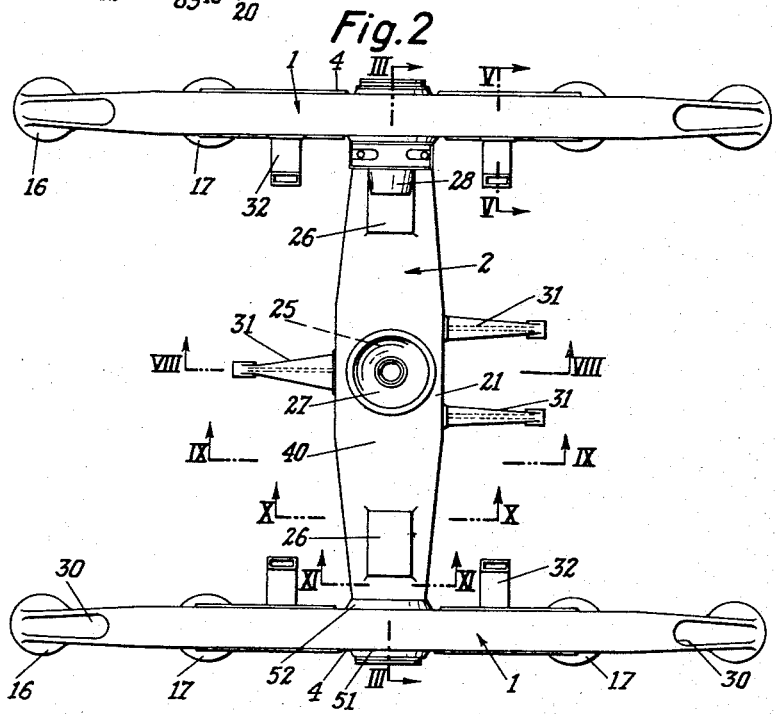
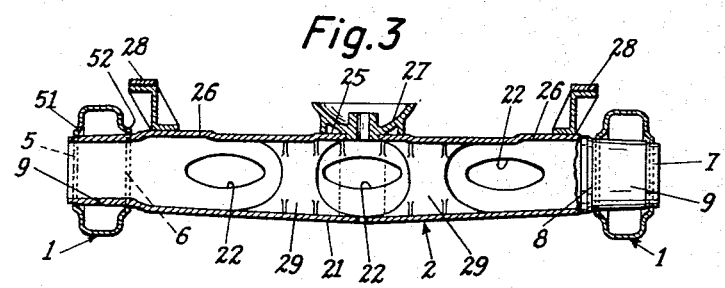
INVENTOR
PIERRE BOISSIER
By Irwin & Thompson
ATTY.

Aug. 29, 1967 P. BOISSIER 3,338,183
RIGID RAILWAY BOGIE
Filed Aug. 12, 1964 6 Sheets-Sheet 2
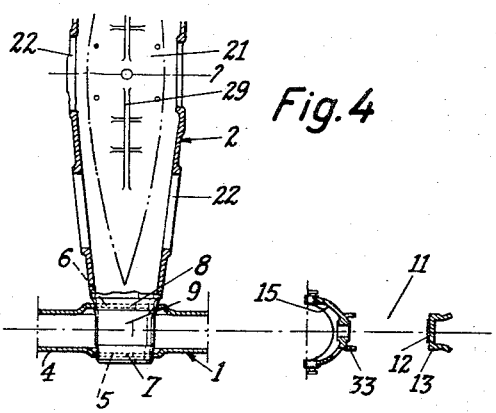
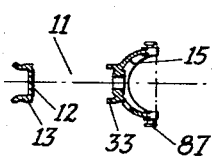
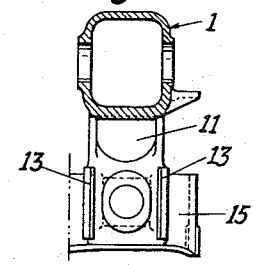
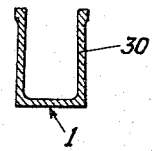
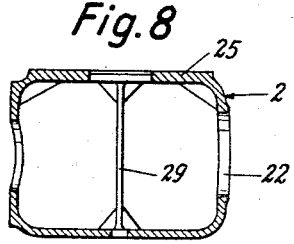
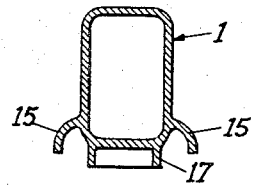
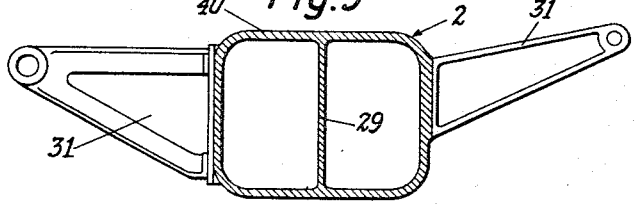
INVENTOR
PIERRE BOISSIER
By Irwin S. Thompson
ATTY.

INVENTOR
PIERRE BOISSIER
By Irwin S. Thompson
ATTY.

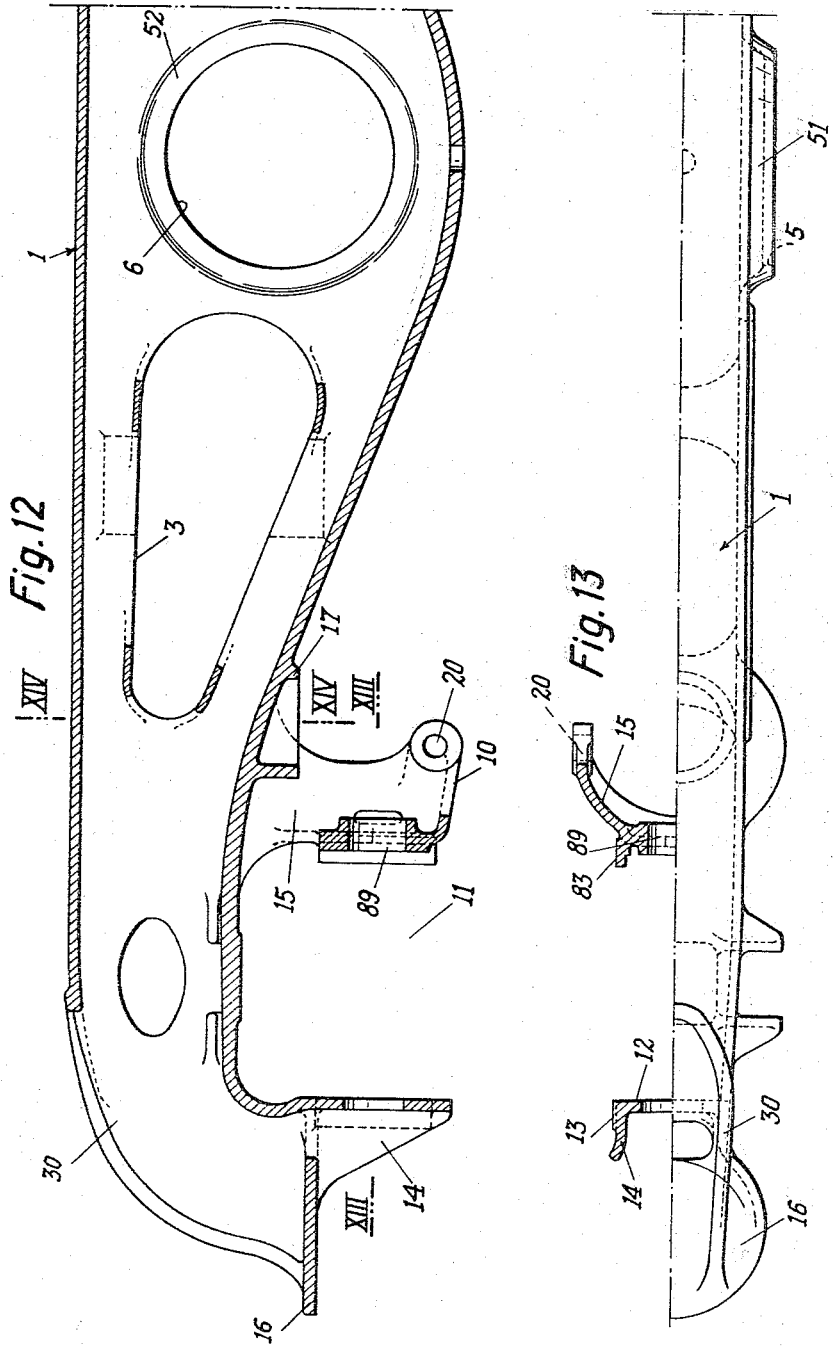

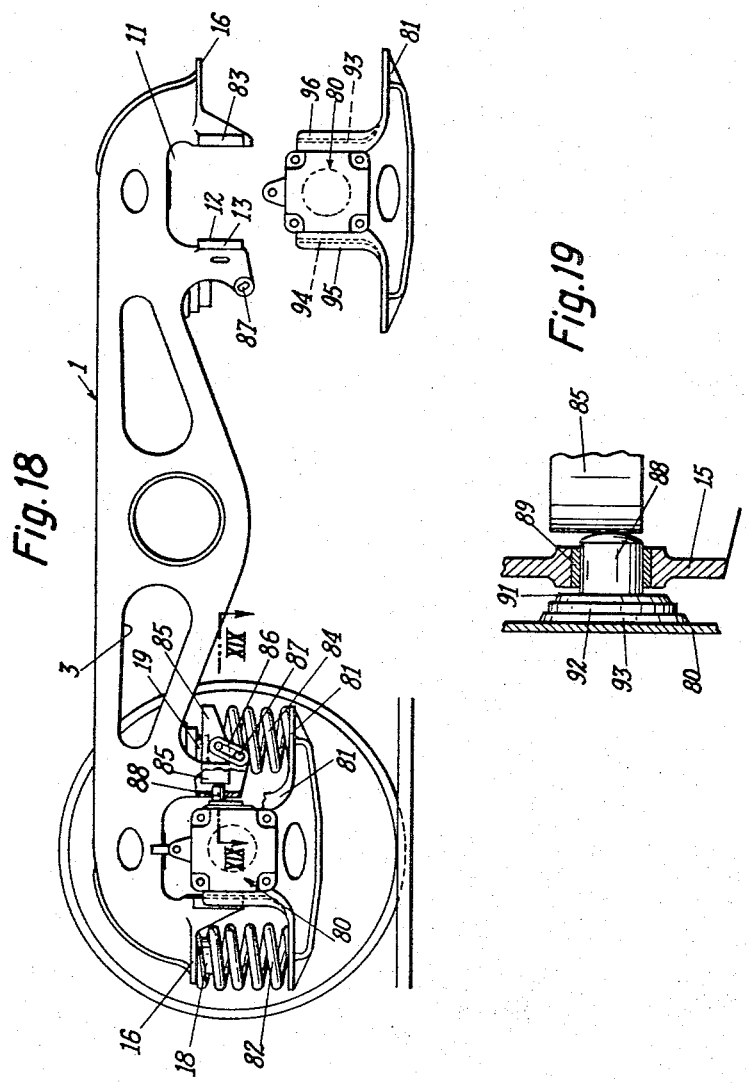

United States Patent Office 3,338,183
Patented Aug. 29, 1967

3,338,183
RIGID RAILWAY BOGIE
Pierre Boissier, Le Chesnay, France, assignor to Usines et Acieries de Sambre et Meuse, Paris, France
Filed Aug. 12, 1964, Ser. No. 389,042
Claims priority, application France, Mar. 25, 1964, 968,627, Patent 86,068
3 Claims. (Cl. 105—202)

The present invention relates to a bogie or truck for railroad vehicles such as railway cars and, in particular, to a bogie or truck of the type having a fixed central crossbar or traversing beam and to the structure of the frame of such a bogie or truck. The invention also relates to the process for the manufacture of such a bogie or truck structure.

As is known, the term fixed crossbar truck in applied to a truck in which the transverse girder or beam (called the central crossbar) that carries the center bearing provided for the body of the vehicle is solid with the lateral bearers (called the longitudinal members) that receive the axle boxes. Many types of trucks of this kind already exist, in which the frame is formed of cut, formed and welded steel sheet, which necessitates long and expensive machining and assembly operations.

The method is already known of manufacturing trucks consisting of two parallel longitudinal members and a fixed central crossbar (H-trucks) by means of a single piece cast steel frame. This frame is then machined wherever necessary having regard to the required dimensions. A disadvantage of this manufacturing process is that it necessitates very large castings and particularly powerful handling and machining equipment. Moreover, experience shows that the making ol long castings of such dimensions is a delicate operation and that serious flaws often appear during cooling. As a result, trucks manufactured by this method sometimes suffer dangerous fractures while in service. Finally, the cost of manufacture of trucks cast in one piece is extremely high.

The purpose if the invention is to eliminate these disadvantages.

One of the objects of the invention is to make it possible to manufacture an H-truck by the assembly of cast steel components with a minimum of machining.

Another object of the invention is to make possible a sufficiently precise assembly of the truck to ensure that it will conform without difficulty to the required carriage gage.

A further object of the invention is to make possible a sufficiently sturdy assembly of the cast steel components to ensure that the truck so constructed can retain an H profile without it being necessary to join the ends of the longitudinal members together by additional strengthening components such as auxiliary crossbars.

A further object of the invention is to enable assembly of parts of the truck using simple assembly equipment and limited handling equipment and also to enable some of the assembly operations to be carried out by automatic means.

Further objects of the invention will be brought out in the course of the following description.

In accordance with the invention, the bogie or truck has two parallel longitudinal members consisting of box girders of cast steel, each of these longitudinal members having two coaxial holes drilled in its middle part. The truck also has a central crossbar, also of cast steel, each end of which has two circular areas machined off to diameters that correspond to the above-mentioned perforations of the longitudinal members. These ends of the crossbar are inserted into the holes in the longitudinal members in such a way that these holes respectively come into contact with the circular machined areas of the ends of the crossbar, these crossbar ends being in addition welded to the longitudinal members around the holes in the latter.

The truck constructed in this way possesses a rigidity that eliminates the need for the auxiliary crossbars usually provided at the ends of the longitudinal members. Such a result may be considered as surprising, since it was not immediately obvious that it would be possible to construct an H-type truck frame by simply welding together three cast steel components.

A noteworthy result is that the approximately right angles of the crossbar and the longitudinal members are left completely free. The space so made available may then be used to accommodate certain brake control components, which in turn makes it possible to reduce the distance between the axles of the truck.

In an advantageous application of the invention, the coaxial holes in each longitudinal member are of different diameters and the circular machined areas of the ends of the crossbar also have correspondingly differing diameters, the circular machined area of the crossbar with the smaller diameter being the one nearer the end of the crossbar.

This arrangement facilitates machining because the width of each circular area that has to be machined on the crossbar can be small and correspond to the thickness of the longitudinal member. This means that the fitting of the longitudinal member on to the crossbar can be carried out to very close tolerances. Experience has further shown that the stepped form thus provided for is more favorable from the point of view of operating stresses.

In a particularly advantageous arrangement provided for by the invention, the hole in the outer side of the longitudinal member is made in an area of the wall of this member that is dished in the direction of the end of the crossbar, while the hole in the inner side of the longitudinal member is made in an area of the wall of this member that is dished in the direction of the center of the crossbar.

This arrangement facilitates the welding operations and gives the union of the longitudinal members and crossbar great operational rigidity.

A a further advantage, the central part of the crossbar is of rectangular section with rounded angles, this cross section becoming progressively rounder towards the ends.

The invention further provides for the subsequent fitting of all the auxiliary gear, such as the brake control supports, by welding on to the longitudinal members and the central crossbar of the H-shaped truck frame thus constructed.

The process according to the invention for the manufacture of the truck in question consists essentially in the manufacturing of two identical box girder longitudinal members of cast steel having two coaxial holes in their central parts, trueing these holes by drilling, manufacturing a central crossbar of cast steel with cylindrical ends on which are machined two circular areas whose diameters and distance apart correspond to those of the coaxial holes in the longitudinal member, fitting the crossbar in the longitudinal members in such a way that the holes in the longitudinal members come opposite the circular machined areas on the crossbar, and welding the crossbar and the longitudinal members together by a circular bead around the holes in the longitudinal members.

In an advantageous application of the process, the two holes in a given longitudinal member are welded on to the corresponding circular machined areas of the crossbar simultaneously.

The attached drawings, which are nonlimitative in scope and serve for example only, show one form of application of the invention.

FIGURE 1 is a side elevation of the truck.
FIGURE 2 is the corresponding plan view.

FIGURE 3 is a section through the crossbar along line III—III of FIG. 2.

FIGURE 4 is a cross section along line IV—IV of FIG. 1, through part of the central crossbar and one of the longitudinal members.

FIGURES 5 to 11 show large-scale cross sections along lines V—V to XI—XI, respectively, of FIGS. 1 and 2, showing in detail the structure of the longitudinal members and that of the crossbar.

FIGURE 12 shows a partial elevation of the longitudinal member in central section.

FIGURE 13 is a one-half plan view of a half section along line XIII—XIII of FIG. 12.

FIGURE 14 is a cross section along line XIV—XIV of FIG. 12.

FIGURE 18 is a side elevation of the truck during the attachment of the axles.

FIGURE 19 is a fragmentary view in cross section along line XIX—XIX of FIG. 18.

Figure 15:
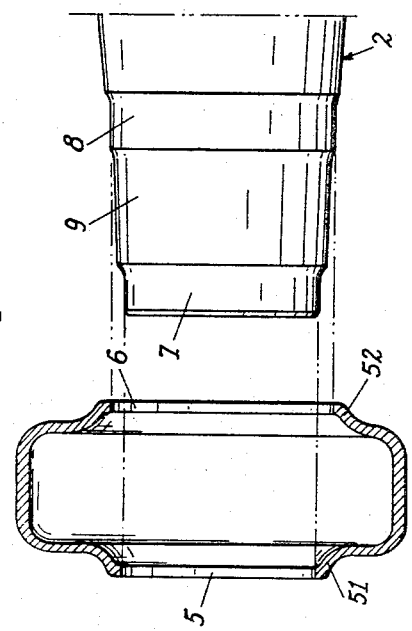
FIGURE 15 is a cross section of the central part of the longitudinal member and a side elevation of the corresponding end of the crossbar before insertion into the longitudinal member.
Figure 11:
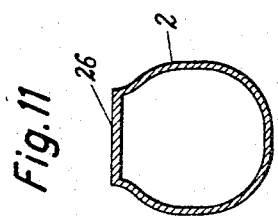
Figure 10:
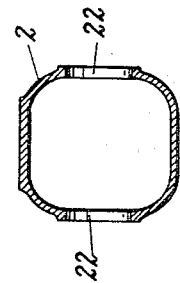

FIGS. 1 and 2 show, in particular, the two-cast steel longitudinal members 1 of the truck, joined by a cast steel central crossbar 2.

In accordance with the present invention, the longitudinal members 1 are of the box type in the sense that their cross section presents a closed outline, with the exception of certain openings 3 made in the side walls for the purpose of reducing the weight of the casting and to serve for the precise placing of the foundry cores.

The central parts of the side walls 4 of each longitudinal member 1 are perforated by coaxially drilled holes 5 and 6 (FIG. 15) of different diameters, the outside hole 5 having the smaller diameter. The holes 5 and 6 are designed to receive the annular machined areas 7 and 8, which are circular in contour and are restricted to the two ends 9 of the crossbar 2, these ends also being of circular cross section.

In the preferred application of the invention represented by the drawings, the holes 5 and 6 are in the dished walls of the longitudinal member 1. More precisely, the hole 5 is made in one wall 51, which is dished in the direction of the free end 9 of the crossbar 2, and the hole 6 is in the other wall 52, which is dished in the direction of the center of that crossbar (FIG. 2).

Figure 16:
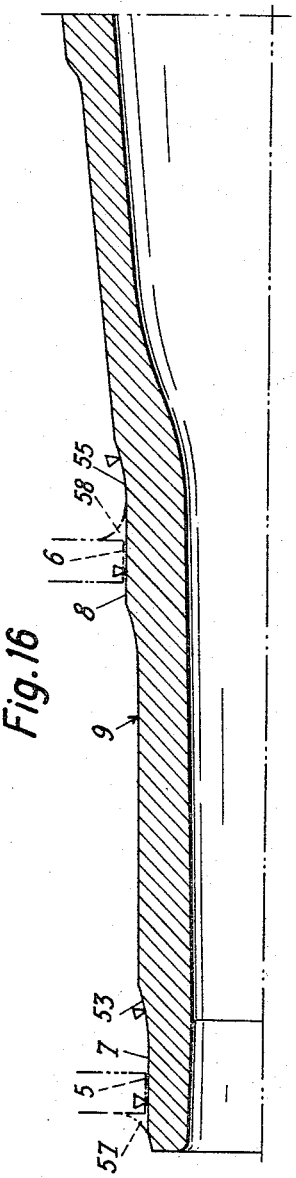
FIGURE 16 is a fragmentary longitudinal section on a very large scale through one of the ends of the crossbar, showing the machining areas.

FIGS. 15 and 16 further show the special shape to which the ends 9 of the crossbar 2 are machined. It is seen in particular that the width of the annular machined areas 7 and 8 is slightly greater than that of the holes 5 and 6, the positions for which are also shown. It is also seen that the annular machined areas 7 and 8 are joined to the rest of the crossbar by toric fillets 53 and 55 that are similarly trued by machining. In FIG. 16, the machined parts are marked by a triangle.

FIG. 15 also shows that the diameters of the homologous surfaces of hole 5 and area 7 are smaller than those of the surfaces of hole 6 and area 8. For example, the diameters of the holes 5 and 6 can be 10.0 inches and 10.8 inches, respectively, and their relative distance apart 7.6 inches with an inside width of the longitudinal member of only 6.4 inches.

The holes 5 and 6 and the annular machined areas 7 and 8 are preferably machined so that there is only very slight play between these parts, e.g. of the order of 0.0012 inch for an average diameter of 10.4 inches. This accuracy can be obtained by turning of the crossbar 2 and the longitudinal members 1, due to the fact that, in particular, the width of the machined parts is small in relation to what it would be if a continuous bearing working surface were provided between the crossbar and the longitudinal member throughout the width of the latter.

This precise fitting together of the parts makes the longitudinal members practically solid with the crossbar even before welding.

The box-girder structure adopted for the longitudinal members 1 reduces the area of their surface contact with the crossbar. The friction when these longitudinal members are fitted on to the crossbar 2 is consequently small in relation to what it would be in the case of a continuous working surface extending for the entire width of the longitudinal member 1. This is one of the advantages obtained by means of the invention.

After they have been fitted on to the crossbar 2, the longitudinal members 1 are welded to the crossbar, preferably by circular weld beads, such as 57 and 58 (FIG. 13), located at the junction of the holes 5 and 6 and of the annular machined areas 7 and 8 and on the external surfaces of each longitudinal member 1. A preferred method of carrying out the welding will be described later.

Beyond the apertures 3, the longitudinal members 1 have recesses 11 to receive the axle boxes, an example of which will be described later. These recesses are bordered by inner wearing plates 12 and lateral wearing plates 13 and 83 that serve as friction blocks and are borne on tongue attachments 14 and 15.

The attachment 15 has an enclosing surface, the rounded edges of which are directed towards the center of the lingitudinal member 1. It terminates downwardly in two lugs 10 with drilled holes 20 that serve, as will be seen, for the attachment of one of the coil springs of the elastic suspension of the truck. The tongue attachment 15 also encloses a hood 17 that serves for the centering of this coil spring.

Beyond the recess 11, the end 30 of the longitudinal member 1 is rounded and, instead of having a box cross section, now has a ribbed U-section (FIG. 7) obtained by eliminating the upper wall of the box. The end 30 opens out into a horizontal hood 16 that forms a supporting plate for another coil spring that is to be placed symmetrically relative to the spring attached to the tongue attachment 15.

Finally, it will be observed that the longitudinal member 1 has a characteristic yoke shape.

The box-grider design adopted for the longitudinal member 1, in conjunction with the special shape described above, is very favorable to the obtainment of great resistance to vertical and transverse stresses. In addition, its steel construction enables these optimum shapes for the working conditions of the truck frame to be obtained without machining.

The crossbar 2 is formed of a hollow beam that varies continuously in cross section from its ends 9, which are circular in section, to its central part 21, which is of square cross section with rounded corners (see FIGS. 8 to 11). Apertures 22 in this beam (FIGS. 4 and 8) serve the same purpose as the apertures 3 in the longitudinal members. The crossbar 2 is also made of cast steel.

This cylindrical-rectangular cross section of the crossbar 2 enables maximum overall strength to be obtained for a given weight of metal. In addition, the absence of sharp angles in the square section part facilitates casting by preventing incipient fissuration.

On the upper surface 40 of the crossbar 2 are located a central flattened area 25 and two lateral flattened areas 26 approximately in the same plane (FIG. 3). These flattened areas receive, respectively, the center bearing 27 (for connection of the body of the railway car) and the side bearings 28 whose purpose is to limit the amplitude of the lateral oscillations of the body.

The structure adopted for the crossbar makes the mounting of these components rapid and simple.

The bending strength of the crossbar 2 is reinforced by internal ribs 29 that are themselves buttressed (FIG. 4).

The equipment of the truck frame is completed by supports 31 for the brake controls. The supports 31 are welded on to the crossbar 2. In addition, attachments 32 welded on to the inner side of the longitudinal members 1 serve as fixed points for the controls. These parts 31 and 32 can also be assembled without difficulty. Finally, the hoods 16 and 17 are provided with centering blocks 18 and 19 for the mounting of the axle suspensions.

Experience has shown that the rigidity of the union between the central crossbar 2 and the longitudinal members 1 is such that this assembly can be used for the truck without the need to add end crossbars or supplementary strengthing components.

In addition, the design of the cast steel components of the truck in accordance with the inventon makes it possible to obtain an extremely simple and unencumbered structure that results in a substantial weight advantage, great simplicity of manufacture, and a relatively low cost.

FIGS. 2 and 4 also show clearly that when the truck has been assembled, the substantially right-angled structure formed by the crossbar 2 and the longitudinal members 1 is completely unencumbered. The space thus made available can be used to accommodate brake controls such as the attachment pieces 32. This makes it possible to reduce the distance between the axles of the truck to its optimum value.

It will further be observed that the method of construction of the truck frame in accordance with the invention offers many alternatives in regard to the welding on of the ancillary fittings for the mounting of the body suspension and of the brake members. Such alternative could, for example, relate to the shape and height of the center bearing 27 and the position of the pieces 28, 31 and 32. This standardization of the truck constitutes an appreciable practical advantage.

The technical effect of certain assembly arrangements made possible by the invention will now be discussed in greater detail.

In addition to the facility of machining already referred to, the fact that the holes 5 and 6 are of different diameters gives greater rigidity to the T-joint between the crossbar 2 and the longitudinal member 1, since the hole 6 with its greater diameter increases the locking effect.

It will also be noted that when the crossbar 2 is bedded into a longitudinal member 1, the section of the latter on the line III—III of FIG. 2 is changed from a double U to an extremely strong double box form.

Because the holes 5 and 6 are drilled in the dished surfaces 51 and 52, their distance apart is greater than the average width of the box girder formed by the longitudinal member. This increases the stability and rigidity of the assembly. The securement of the crossbar 2 in the longitudinal member 1 is improved. In addition, however, it is possible, owing to the continuously increasing diameter of the crossbar, to join the longitudinal member to an appreciably thicker part of the crossbar. Moreover, since the holes 5 and 6 can in this way be kept quite wide apart (e.g. eight inches) the heat stresses developed during the welding of one hole do not affect the other so that, as will be seen, both the holes 5 and 6 of a given longitudinal member can be welded simultaneously. This in turn enables compensation of the strains in the castings during welding, an important factor for obtaining a strictly parallel condition of the longitudinal members.

Experience has shown that once they have been applied, the circular welds 57 and 58 are subject to only a low stress ratio, a fact that was not foreseeable and that justifies the method of assembly of the truck according to the invention.

Figure 17:
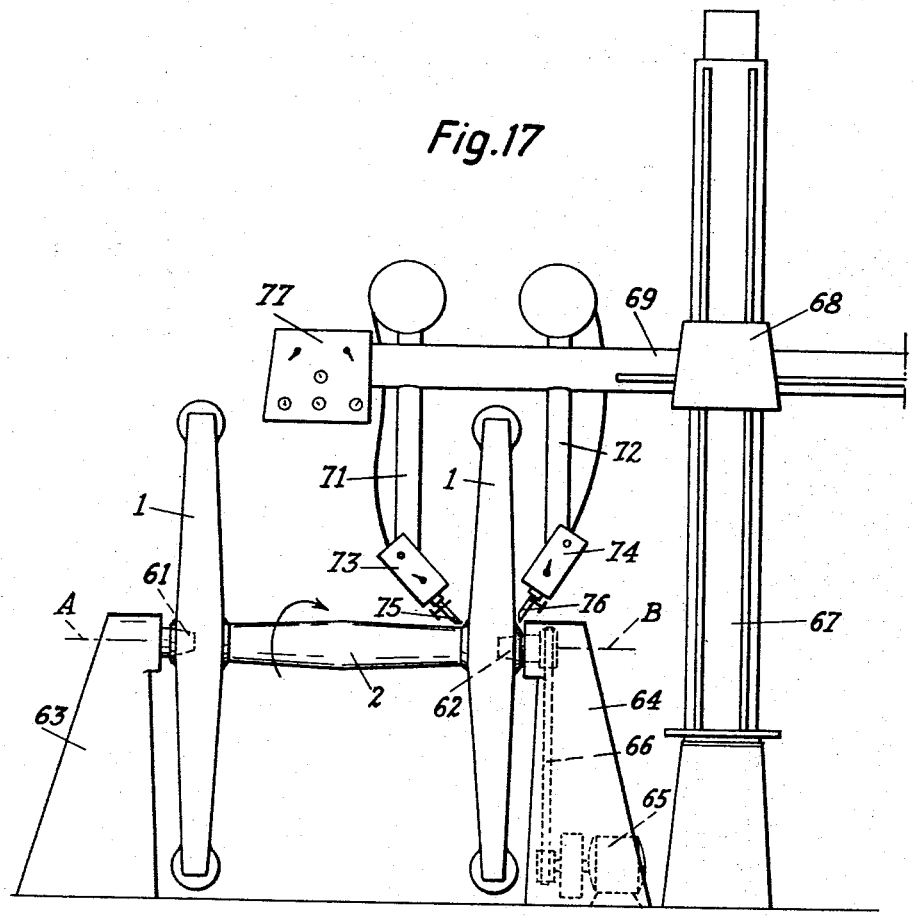
FIGURE 17 shows the crossbar in an elevational view of the truck frame in process of assembly on a welding machine.

For the welding of the longitudinal members 1 onto the crossbar 2, the invention envisages as a preferable method the use of a setup of the type illustrated in FIG. 17, which enables the operation to be carried out automatically.

The longitudinal members 1, fitted on to the crossbar 2, are fixed in mandrels 61 and 62 placed opposite each other and engaged in the terminal orifices of the crossbar. The mandrels 61 and 62 are mounted rotatably on columns 63 and 64. The mandrel 62 can be rotated under power by means of a motor 65 and a transmission 66. This arrangement enables the truck frame formed of the two longitudinal members 1 and the crossbar 2 to be turned continuously around a horizontal axis AB that coincides with the axis of the crossbar 2.

The welding device, which is placed beside the column 64, consists of a column 67 on which slides a traveling head 68 which is pierced by a sliding horizontal arm 69. The arm 69 carries two rods 71 and 72 that terminate in welding heads 73 and 74, whose electrodes 75 and 76 are shown in the working position. The operation of the welder and the rotation by the motor 65 are controlled from a central panel 77 carried on the arm 69. In the example illustrated, the electrodes 75 and 76 are located in a single plane, but any other relative orientation could be adopted.

Before the truck frame is positioned between the mandrels 61 and 62, the longitudinal members 1 are temporarily secured on the crossbar 2 by three welding arcs arranged around the holes 5 and 6, the whole assembly of the parts 1–2–1 being then placed on a template that enables the longitudinal members to be placed in their exact positions on the crossbar.

For the welding by means of the electrodes 75 and 76, the method used is submerged arc welding, in which the arc is concealed by the welding flux. The weld 57 (or 58) can be made in one pass but is preferably made in several passes, each producing self-annealing of the preceding pass. The maximum thickness of the weld in the example described can be about 0.3 inch. It is attempted to obtain concave joining fillets that are free of surface roughness and of defects capable of producing incipient fissuration with fatigue. Due to the automatic setup described, this regularity of the weld surface can be obtained without difficulty.

If it is found at the moment of welding that the ends of the longitudinal members 1 are not exactly at the desired distance apart, this can be remedied by beginning the welding of the holes 5 and 6 at points not located opposite each other.

A possible method of equipping the truck frame in accordance with the invention is described below by way of example. In this method, the axle boxes 80 are intended to be housed and to slide in the recesses 11 of the longitudinal members 1. On the lower part of each axle box is secured a plate 81 on which rest the suspension spring sets 82 and 84. The spring set 82 is located to the outside of the longitudinal member 1 and is supported directly beneath the hood 16 and around the centering block 18. The spring 84 is surmounted by a cap 85 movable about the centering block 19 and attached by lateral clamps 86 to bosses 87 fixed in the drilled holes 20 of the lugs 10 of the longitudinal member 1. The cap 85 bears against a push rod 88 (FIG. 19) that runs through a cutout 89 in the tongue attachment 15. The push rod 88 terminates in a shoe 91 which is provided with a friction plate 92 located opposite a friction block 93 carried on the corresponding face of the axle box 80. Another friction block 94 of the axle box 80 is intended to come into contact with the wearing plate 12. The axle box 80 further includes lateral plates 95 and 96, the inner faces of which are in contact with the wearing plates 13 and 83, respectively, which guide them in their travel.

It will be understood that the pull exerted by the clamps 86 on the cap 85 of the spring 84 causes this cap to bear against the push rod 88. The friction plate 92 is thereby pressed against the friction block 93 with greater force, the greater the dynamic action on the spring 84. The variable frictional forces thus developed provide the damping of the suspension.

Having described my invention, I claim:

1. A truck for railroad vehicles, comprising two parallel longitudinal side members formed of cast steel box girders, each of said box girders having a substantially quadrilateral cross section and two lateral side walls, each of said members having two coaxial circular holes in its central part and extending through said side walls, and a central crossbar, also of cast steel, said crossbar having two ends of circular cross section, two spaced annular machined areas on each of said ends, said crossbar ends traversing respectively said box girders through said holes and being in contact therewith only along said annular machined areas, said crossbar being welded to said box girders only along the outer junction of said holes along said spaced annular machined areas of said crossbar, said ends of said crossbar when welded to said box girders forming the only brace between said side walls at said holes.

2. A truck for railroad vehicles, comprising two parallel longitudinal members formed of cast steel box girders, each box girder having a pair of inner and outer spaced sides, each of these members having two coaxial drilled holes through said sides in its central part, and a central crossbar, also of cast steel, said crossbar having at each of its ends two annular surfaces of diameters that correspond to those of the two holes in the longitudinal members, these ends of the crossbar being disposed in the holes in the longitudinal members in such a way that the holes are in contact, respectively, with said annular surfaces of the ends of the crossbar, said ends being welded to the longitudinal members around the holes in those members, the coaxial holes in each longitudinal member being of different diameters and said surfaces of the ends of the crossbar having correspondingly differing diameters, the said annular surface with the smaller diameter being the one through said outer side.

3. A truck for railroad vehicles, comprising two parallel longitudinal members formed of cast steel box girders, each box girder having a pair of inner and outer spaced sides, each of these members having two coaxial drilled holes through said sides in its central part, and a central crossbar, also of cast steel, said crossbar having at each of its ends two annular surfaces of diameters that correspond to those of the two holes in the longitudinal members, these ends of the crossbar being disposed in the holes in the longitudinal members in such a way that the holes are in contact, respectively, with said annular surfaces of the ends of the crossbar, said ends being welded to the longitudinal members around the holes in those members, the hole located in the outer side of the longitudinal member being in an area of the wall of the longitudinal member that is extended outwardly in the direction of the adjacent end of the crossbar, and the hole located in the inner side of the longitudinal member being in an area of the wall of said longitudinal member that is extended outwardly in the direction of the center of the crossbar, the two welds at each longitudinal member being spaced apart a distance greater than the horizontal thickness of the longitudinal member.

References Cited

UNITED STATES PATENTS

| | | | |
|---|---|---|---|
| 404,676 | 6/1889 | Blaine | 105—202 |
| 495,339 | 4/1893 | Hunt | 105—206 |
| 844,151 | 2/1907 | Lindenthal | 105—202 |
| 1,009,747 | 11/1911 | Hewilt | 105—206 |
| 1,731,510 | 10/1929 | Todd | 105—202 |
| 1,994,304 | 3/1935 | Devlin | 105—202 |
| 1,997,662 | 4/1935 | Suckfield | 105—208 |
| 2,061,767 | 11/1936 | Hobson | 105—196 |

FOREIGN PATENTS

| | | |
|---|---|---|
| 1,340,882 | 9/1963 | France. |

ARTHUR L. LA POINT, *Primary Examiner.*

H. BELTRAN, *Assistant Examiner.*